US012668733B2

(12) United States Patent
Erhan

(10) Patent No.: US 12,668,733 B2
(45) Date of Patent: Jun. 30, 2026

(54) DRILLING FLUID COMPOSITIONS COMPRISING A POLYMERIZED BIORENEWABLE OIL

(71) Applicant: Ergon, Inc., Flowood, MS (US)

(72) Inventor: Selim Erhan, Sugar Land, TX (US)

(73) Assignee: Ergon, Inc., Flowood, MS (US)

( * ) Notice: Subject to any disclaimer, the term of this patent is extended or adjusted under 35 U.S.C. 154(b) by 0 days.

(21) Appl. No.: 19/117,435

(22) PCT Filed: Oct. 4, 2023

(86) PCT No.: PCT/US2023/034487
§ 371 (c)(1),
(2) Date: Apr. 1, 2025

(87) PCT Pub. No.: WO2024/076647
PCT Pub. Date: Apr. 11, 2024

(65) Prior Publication Data
US 2026/0125593 A1      May 7, 2026

Related U.S. Application Data

(60) Provisional application No. 63/378,347, filed on Oct. 4, 2022.

(51) Int. Cl.
*C09K 8/035* (2006.01)
*E21B 21/00* (2006.01)

(52) U.S. Cl.
CPC .............. *C09K 8/035* (2013.01); *E21B 21/00* (2013.01); *C09K 2208/34* (2013.01)

(58) Field of Classification Search
CPC ....................................................... C09K 8/035
See application file for complete search history.

(56) References Cited

U.S. PATENT DOCUMENTS

| | | | | |
|---|---|---|---|---|
| 6,750,180 | B1 * | 6/2004 | Argillier | .............. C10M 173/02 |
| | | | | 507/131 |
| 10,626,314 | B1 * | 4/2020 | Bennett | .................. C09K 8/035 |
| 2007/0287636 | A1 | 12/2007 | Heller et al. | |
| 2018/0044529 | A1 | 2/2018 | Kurth et al. | |
| 2018/0223178 | A1 * | 8/2018 | Miller | ...................... C09K 8/64 |
| 2020/0157401 | A1 | 5/2020 | Xu et al. | |

FOREIGN PATENT DOCUMENTS

| | | |
|---|---|---|
| CN | 109135691 A1 | 1/2019 |
| WO | 2007/146067 A2 | 12/2007 |
| WO | 2016/149102 A1 | 9/2016 |
| WO | 2017/176244 A1 | 10/2017 |

OTHER PUBLICATIONS

Methanol Institute, "A Biodiesel Primer: Market & Public Policy Developments, Quality, Standards & Handling" (2013), downloaded from the Internet at https://www.methanol.org/wp-content/uploads/2016/06/2013-Biodiesel-Primer.pdf.
PCT Application No. PCT/US2023/034487, International Search Report and Written Opinion dated Feb. 2, 2024, 8 pages.

* cited by examiner

*Primary Examiner* — William D Hutton, Jr.
*Assistant Examiner* — Avi T Skaist
(74) *Attorney, Agent, or Firm* — Husch Blackwell LLP

(57) ABSTRACT

A drilling fluid composition is provided herein. The drilling fluid composition comprises biorenewable components, such as a polymerized biorenewable oil and at least one of biodiesel and a nonpolymerized biorenewable oil. The drilling fluid composition is thus more environmentally friendly than conventional, petroleum-based alternatives. Water-based and oil-based drilling fluids comprising the drilling fluid composition are also provided as are methods of lubricating a borehole (e.g., a downhole well) utilizing the drilling fluid composition.

18 Claims, No Drawings

DRILLING FLUID COMPOSITIONS COMPRISING A POLYMERIZED BIORENEWABLE OIL

CROSS-REFERENCE TO RELATED APPLICATIONS

This application is a national stage entry under 35 U.S.C. § 371 of International Application No. PCT/US2023/034487, filed Oct. 4, 2023 and entitled "DRILLING FLUID COMPOSITIONS COMPRISING A POLYMERIZED BIORENEWABLE OIL", which claims the benefit of U.S. Provisional Application No. 63/378,347, filed Oct. 4, 2022 and entitled "DRILLING FLUID COMPOSITIONS COMPRISING A POLYMERIZED BIORENEWABLE OIL", the disclosures of which are hereby incorporated by reference in their entirety.

FIELD

Drilling fluid compositions comprising a polymerized biorenewable oil, and optionally, biodiesel, are provided.

BACKGROUND

Drilling fluids, also called drilling muds, have multifunctional roles during drilling operations for oil or water extraction. Specifically, drilling fluids lubricate, clean and cool the drill bit, take up debris from the well, and stabilize the formation walls in contact with the drilling mud. These are all very important functions in a very expensive operation.

Additives are often incorporated into drilling fluids to assist the drilling fluids in performing these functions. A commercially successful drilling fluid additive will speed the drilling operation. Given that typical drilling operations can cost tens of thousands to hundreds of thousands of dollars per day, any opportunity for cost savings is welcome in the industry. Successful drilling fluid additives will also increase the life of the drill bit, which not only saves replacement costs, but also, the time cost of replacing a worn bit at the end of a drilling line that can extend a distance of three miles or more.

There is a significant and continuing need for drilling fluid compositions that have good handling characteristics, stability, and low cost so that it can be inexpensively mixed with new or existing drilling fluids to improve the lubricity thereof.

SUMMARY

Such a drilling fluid composition is provided herein. The drilling fluid composition comprises biorenewable components, and so, is more environmentally friendly than conventional, petroleum-based alternatives. Use of combinations of a polymerized biorenewable oil, in combination with at least one of biodiesel and a nonpolymerized biorenewable oil allows the benefits of the polymerized biorenewable oil to be realized while using lower quantities of the polymerized biorenewable oil, so that cost effective embodiments are provided. Some drilling fluid compositions within the scope of the present disclosure may provide improvements to the coefficient of friction of a base fluid that exceed the additive coefficient of friction improvements provided by the polymerized biorenewable oil, the biodiesel, or the nonpolymerized biorenewable oil when utilized in the base fluid separately.

A drilling fluid composition is provided and comprises a polymerized biorenewable oil and at least one of biodiesel and a nonpolymerized biorenewable oil. In some embodiments, the drilling fluid composition comprises a polymerized biorenewable oil and biodiesel, while in others, the drilling fluid composition comprises a polymerized biorenewable oil and a nonpolymerized biorenewable oil, while in yet others, the drilling fluid composition comprises a polymerized biorenewable oil, biodiesel, and a nonpolymerized biorenewable oil.

The ratio of biodiesel or nonpolymerized biorenewable oil to polymerized biorenewable oil in the drilling fluid composition can be from 10:1 to 1:10, or from 4:1 to 1:4.

The polymerized biorenewable oil may suitably have an oligomer content from about 15 wt % to about 70 wt %. In these, or other, embodiments, the polymerized biorenewable oil has a polydispersity index from about 1.2 to 20.0.

The biorenewable oil may be derived from any animal, plant, or microbiological source. In some embodiments, the polymerized biorenewable oil or the nonpolymerized biorenewable oil comprise a vegetable oil. The vegetable oil may be selected from the group consisting of soy, canola, rapeseed, mamouna, mustard, palm, babassu, pine, coffee, cottonseed, sunflower, jojoba, tung, castor, olive, peanut, cashew nut, pumpkin seed, corn, rice, perilla, sesame, coconut, safflower, linseed, hemp. Chinese tallow tree, tall oil, lecithin (phospholipids), and combinations thereof. In some embodiments, the polymerized biorenewable oil or the nonpolymerized biorenewable oil comprise soy oil, canola oil, rapeseed oil, or a combination of these. In some embodiments, the polymerized biorenewable oil or the nonpolymerized biorenewable oil consists of soy oil, canola oil, or a combination of these.

In some embodiments, the drilling fluid composition may comprise less than 5 wt % of petrodiesel, mineral oil, and mineral oil derivatives. In some embodiments, the drilling fluid composition is substantially free of petrodiesel, mineral oil, and mineral oil derivatives.

In another aspect, a water-based drilling fluid is provided. The water-based drilling fluid comprises a polymerized biorenewable oil and at least one of biodiesel and a nonpolymerized biorenewable oil, wherein wt % is based upon the total weight of the water-based drilling fluid. The polymerized biorenewable oil or nonpolymerized biorenewable oil may comprise soy oil, canola oil, rapeseed oil, or a combination of these, and in some embodiments, the polymerized biorenewable oil or nonpolymerized biorenewable oil consists of soy oil, canola oil, or a combination of these. The drilling fluid composition may comprise a ratio of the biodiesel or a nonpolymerized biorenewable oil to the polymerized biorenewable oil of from about 4:1 to about 1:4.

In another aspect, an oil-based drilling fluid is provided. The oil-based drilling fluid comprises at least about 50 wt % of a drilling fluid composition comprising a polymerized biorenewable oil and at least one of biodiesel and a nonpolymerized biorenewable oil, wherein wt % is based upon the total weight of the oil-based drilling fluid.

In another aspect, a method of lubricating a downhole well is provided. The method comprises providing a drilling fluid composition comprising a polymerized biorenewable oil and at least one of biodiesel and a nonpolymerized biorenewable oil to the down hole well and circulating the composition through the well.

DETAILED DESCRIPTION

The present specification provides certain definitions and methods to better define the present disclosure and to guide those of ordinary skill in the art in the practice of the present disclosure. Provision, or lack of the provision, of a definition for a particular term or phrase is not meant to bely any particular importance, or lack thereof. Rather, and unless otherwise noted, terms are to be understood according to conventional usage by those of ordinary skill in the relevant art.

The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items, and the terms "front", "back", "bottom", or "top", unless otherwise noted, are merely used for convenience of description, and are not limited to any one position or spatial orientation.

If ranges are disclosed, the endpoints of all ranges directed to the same component or property are inclusive and independently combinable (e.g., ranges of "up to about 25 wt. %, or, more specifically, about 5 wt. % to about 20 wt. %," is inclusive of the endpoints and all intermediate values of the ranges of "about 5 wt. % to about 25 wt. %." etc.). Further, ranges are inclusive of all numbers subsumed within that range (e.g., 1 to 5 includes 1, 1.5, 2, 2.75, 3, 3.80, 4 and 5).

All percentages are weight percentages unless otherwise stated.

The modifier "about" used in connection with a quantity is inclusive of the stated value and has the meaning dictated by the context (e.g., includes the degree of error associated with measurement of the particular quantity). When applied to a range of values, modification with the term "about" indicates the values in the range of numbers may be considered to be equivalent in the context in which the range is recited. For example, a range of "about 5 to 15 wt % polymer" means that any weight percent of polymer between 5 and 15 wt % is expected to provide the same or substantially similar result within the context that the polymer is being employed. The term "about" refers to a range of numbers that may be considered equivalent to a recited value (e.g., having the same function or result), and includes values rounded to the nearest significant figure.

Reference throughout the specification to "one embodiment" or "an embodiment" means that a particular feature, structure, or characteristic described in connection with an embodiment is included in at least one embodiment. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The term "biorenewable" refers to compositions from natural or biological resources, including derivatives or modifications thereof.

The term "biodiesel" is used and defined herein in accordance with ASTM Standard No. D6751-07a, viz., as "a fuel comprised of mono-alkyl esters of long chain fatty acids derived from vegetable oils or animal fats." The biodiesel referenced herein for use in the drilling fluid compositions is neat biodiesel, or B100.

The term "oligomer" is defined as a polymer having a number average molecular weight (Mn) larger than 1000.

"Polydispersity Index" or "molecular weight distribution" is the ratio of weight average molecular weight to number average molecular weight (Mn). The molecular weight and polydispersity data can be collected using gel permeation chromatography and an appropriate column, solvent, flow rates and temperatures, given the molecule being analyzed.

As used herein, the term "drilling fluid additive" is used with the inventive composition in a base fluid in an amount of less than 15 wt %, or less than 10%, or less than 5 wt %. Typically, when the disclosed composition is used in such amounts, it is incorporated into a water-based drilling mud.

On the other hand, as used herein, the terms "base fluid" or "base fluid composition" are applied when the inventive composition is used in amounts of greater than 50 wt %, or 60 wt %, or 70 wt %, or 80 wt %, as may typically be the case when the inventive base fluid composition is incorporated into, or used to prepare, an oil-based drilling mud.

Drilling Fluid Composition

The drilling fluid composition components are desirably biobased and comprise a biorenewable oil, and optionally, biodiesel.

The drilling fluid composition components may be derived from oils isolated from plants, animals, and microorganisms including algae.

Plant-based oils that can be utilized in the drilling fluid composition include, but are not limited to, soy, canola, rapeseed, mamouna, mustard, palm, babassu, pine, coffee, cottonseed, sunflower, jojoba, tung, castor, olive, peanut, cashew nut, pumpkin seed, corn, rice, perilla, sesame, coconut, safflower, linseed, hemp. Chinese tallow tree, tall oil, lecithin (phospholipids), and combinations and crude streams thereof or co-products, by-products, or residues resulting from oil refining processes.

Animal fats can be used, but would desirably be rendered liquid, e.g., in oil form, prior to incorporation into the drilling fluid composition. Examples of animal-based fats include, but are not limited to, poultry offal, tallow, lard, butter, neatsfoot, and fish oils. Combinations of animal fats and crude streams thereof can also be used.

Combinations of polymerized biorenewable oils may also be used, as well as combinations of one or more polymerized biorenewable oils, along with one or more nonpolymerized biorenewable oils derived from the same, or a different, source. For example, a combination of a blown soy oil and a nonpolymerized canola oil can be used, as can a combination of a blown canola oil, a blown soy oil, and a nonpolymerized rapeseed oil. As blown biorenewable oils typically cost more than nonpolymerized biorenewable oils, use of such a combination can provide cost effective alternatives suitable for use in some applications.

Multiple blown oils derived from the same source and polymerized to a different degree can also be used. As one example of such an embodiment, a combination of a blown soy Z2 oil and a blown soy Z3 oil may be used.

In some embodiments, the drilling fluid composition is comprised entirely of biorenewable components, and in such embodiments, the drilling fluid composition is more environmentally friendly than conventional, petroleum-based alternatives. For example, in those embodiments wherein the drilling fluid composition is substantially free of petroleum-based drilling fluid additives, the drilling fluid composition may be non-toxic, biodegradable, and contain substantially no aromatics that may have negative health impacts.

While various types of mineral oils and mineral oil derivatives fall between biodiesel and petrodiesel in terms of their environmental impact, any negative environmental impacts can be minimized by utilizing embodiments of the drilling fluid compositions that do not contain any petrodiesel, mineral oil, or mineral oil derivatives. Nonetheless, drilling fluid compositions containing small amounts, e.g., less than 10 wt %, less than 5 wt %, less than 2.5 wt %, or less than 1 wt %, of petrodiesel, mineral oil, or mineral oil derivatives are contemplated and are considered within the scope of the disclosure. Desirably, in embodiments of the drilling fluid additives or drilling fluids wherein petrodiesel, mineral oil, or mineral oil derivatives are included, the drilling fluid additive or drilling fluid yet satisfies the 275-day degradation test (ISO 11734-1995; EPA Method 1647) or the 10-day *Leptocheirus plumulosus* toxicity test (ASTM E-1367-A5).

Biodiesel

Biodiesel may be made from various forms of oils, fats, and greases. See. "A Biodiesel Primer: Market & Public Policy Developments, Quality, Standards & Handling", published by Methanol Institute and International Fuel Quality Center (April 2006)). Generally, biodiesel is made when fats and oils are reacted chemically with an alcohol, typically methanol, and a catalyst, typically sodium or potassium hydroxide to produce an ester, e.g., biodiesel. More specifically, the aforementioned reaction proceeds via a transesterification, whereby glycerin is separated from the fat or vegetable oil. The process leaves behind two products- methyl esters (biodiesel) and glycerin (a byproduct usually used in soap and other products).

The biodiesel component comprises alkyl (methyl or ethyl) esters derived from long chain fatty acids, which were derived from processing the animal, vegetable, or microorganism feedstocks described above.

In some embodiments, the biodiesel is a standardized methyl or ethyl ester, such as soybean methyl ester, palm methyl ester, rapeseed methyl ester, or any other vegetable-derived methyl or ethyl ester. Soybean methyl ester, for example, has an average molecular weight of 292.2 and may also contain several fatty acids such as palmitic, stearic, oleic, linoleic, and linolenic acids.

Commercial sources of biodiesel in the U.S. include Archer Daniels Midland, Cargill, Inc., Renewable Energy Group. Global Alternative Fuels, LLC; Eberle Biodiesel, LLC, Delek US, to name a few.

Biorenewable Oil

In addition to the oils mentioned above, biorenewable oils can also include partially hydrogenated oils, oils with conjugated bonds, and bodied oils wherein a heteroatom is not introduced, for example, including but not limited to diacylglycerides, monacylglycerides, and free fatty acids.

Biorenewable oils can also include derivatives thereof, for example, previously modified or functionalized oils (and whether intentionally or unintentionally modified or functionalized) wherein a heteratom (e.g., oxygen, nitrogen, sulfur, or phosphorus) has been introduced. Such modified or functionalized oils may also be polymerized and used in the additive. Examples of intentionally modified oils include alkyl esters of fatty acids (e.g., methyl, ethyl, propyl and butyl esters), diol and triol esters (e.g., ethylene glycol, propylene glycol, butylene glycol and trimethylolpropane), and mixtures thereof. Examples of unintentionally modified oils include used cooking oil, trap grease and other industrial oils.

The biorenewable oil can be polymerized by any known process. Examples of such methods are disclosed in, e.g., US Patent Publication No. 2018/0044529. Blowing is typically achieved by passing or exposing an oxygen-containing stream through or to the biorenewable oil, or a composition containing the biorenewable oil (such as the drilling fluid additive or drilling fluid disclosed herein) with or without heating. Those of ordinary skill in the art are aware that any other process that will enable oxidation may be used as well to achieve results similar to those achieved by a blowing process.

In one exemplary blowing process, a vessel containing the biorenewable oil, or drilling fluid composition containing the biorenewable oil, may operate at atmospheric pressure. The pressure of the oxygen-containing stream being blown through the oil is generally high enough to achieve the desired air flow through the biorenewable oil. The oxygen-containing stream is introduced at a sufficient flow rate, e.g., from about 40 to 450 cubic feet per minute. Desirably, the oxygen-containing stream will be dispersed evenly in the vessel to maximize surface area exposure of the oil to the oxygen. A distribution ring or spoke like header may be provided in the vessel to create small volume bubbles evenly within the oil in order to maximize surface area exposure. The oxygen-containing stream will desirably be blown through the oil for a sufficient period of time to achieve the desired viscosity, oligomer/monomer content, molecular weight, or polydispersity, and the amount of time will vary dependent on the desired properties of the blown oil.

The oxygen-containing stream can be an oxygen rich stream derived from air, or the oxygen-containing stream may comprise air. Alternatively, the oxygen-containing stream may comprise hydrogen peroxide.

The blowing reaction may be monitored using gel permeation chromatography or viscosity measurements until the desired degree of polymerization is reached.

The biorenewable oil can be heated before or during the blowing step. Heating may increase the polymerization rate of the blowing process, and in instances wherein the same is desired, the biorenewable oil, drilling fluid additive, or drilling fluid may be heated to temperatures of greater than about 70° C. or 80° C. or 90° C. or 100° C. or 110° C., or even greater than 120° C.

Additives, hydrocarbon monomers, initiators, catalysts, accelerators, or combinations of these may be added to the biorenewable oil before or during any heating step. Additives that provide additional benefits to the biorenewable oil, such as emulsifiers, may be used to enhance the application performance, emulsifiability, etc. of the drilling fuel additive or drilling fluid including the blown oil.

Initiators such as peroxide or tung oil may be added to the biorenewable oil before or during any heating step. Catalysts may also be added before, during, or after any heating step to aid in the subsequent blowing step. Metal catalysts, and in particular, transition metal catalysts, are suitable. Cobalt, iron, zirconium, lead, or combinations of these are suitable transition metals for use in a transition metal catalyst to aid the blowing process.

Accelerators may also be added to the biorenewable oil to assist the blowing process. For example, oxidizing chemicals, such as persulfates and permanganates, may be added to the biorenewable oil. In the presence of oxygen (from the oxygen-containing stream), these oxidizers accelerate oxidative polymerization.

The blowing reaction can be carried out until a polymeric distribution having between about 2 wt % and about 80 wt % oligomers, or between about 5 wt % and about 70 wt % oligomers, or about 10 wt % to about 60 wt % oligomers is achieved. Stated another way, the blowing reaction can be carried out until a polymeric distribution having from 20 wt % to 98 wt % monomers, or from 30 wt % to 90 wt % monomers, or from 40 wt % to 80 wt % monomers is achieved. In some embodiments, the polymeric distribution of the polymerized oil ranges from about 50 wt % to about 75 wt % oligomers and from about 25 wt % to about 50 wt % monomers.

Desirably, the blowing reaction will result in a polymerized biorenewable oil having a polydispersity index from about 1.0 to about 20, or from about 1.10 to about 18, or from about 1.20 to about 16.

Another exemplary process for polymerizing the biorenewable oil is to make what is known as a heat bodied oil. In this method, the biorenewable oil is heated above 270° C. and held until the desired properties are achieved.

Polymerized oils can also be produced via co-reactions with other materials including but not limited to dibasic acids, polyols, amines, epoxides and epoxidation, phenolics, as well as olefinic hydrocarbon monomers. Olefinic monomers may include styrene, alpha methyl styrene, vinyl toluene, indene, dicyclopentadiene, piperylene, and isoprene.

The polymerized biorenewable oil will desirably have a number average molecular weight of less than 100,000, or less than 90,000, or less than 80,000, or less than 70,000, or less than 60,000, or less than 50,000, or less than 40,000, or less than 30,000, or less than 20,000. The number average molecular weight of the polymerized oil may desirably be greater than 200, or greater than 500, or greater than 1000 or greater than 1500, or greater than 2000, or greater than 2500, or greater than 3000. The number average molecular weight of the polymerized oil may range from about 200 to about 100,000, or from about 500 to about 90,000, or from about 1000 to about 80,000 or from about 1500 to about 70,000, or from about 2000 to about 60,000, or from about 2500 to about 50,000, or from about 3000 to about 40,000.

The weight average molecular weight (Mw) of the polymerized biorenewable oil may desirably be less than 200,000 or less than 175,000, or less than 150,000, or less than 125,000 or less than 100,000. The weight average molecular weight of the polymerized oil may desirably be greater than 500, or greater than 1000, or greater than 1500 or greater than 2000 or greater than 2500. The weight average molecular weight of the polymerized oil may range from about 500 to about 200,000, or from about 1000 to about 175,000, or from about 1500 to about 150,000, or from about 2000 to about 125,000 or from about 2500 to about 100,000.

The Mn or Mw of the polymerized oil may be determined by GPC. Specifically, the Mn and Mw of the polymerized oil may be determined using an Agilent 1260 Infinity II HPLC System equipped with a 1260 Infinity II refractive index detector. Two 7.5×300 mm. 3 μm MesoPore HPLC columns rated for 0-25,000 Da may be used in series along with a guard column, and the detector signals may be recorded and analyzed using OpenLAB ChemStation & Cirrus GPC software by Agilent. Calibration can be performed using polystyrene standards ranging from 162 to 56,600 g/mol and thereafter a flow of stabilized THE established at a flow rate of 1.0 mL/min. Sample solutions can be prepared in stabilized THF at a nominal concentration of 6 mg/mL. Sample solutions with an injection volume of 100 μL were introduced at an injection rate of 200 μL/min. The system is operated at a temperature of 35° C.

The viscosity of the polymerized oil will vary based upon the starting oil material, but generally ranges from 10 to about 20,000 centipoise at 25° C.

Water Based Drilling Fluids Comprising the Drilling Fluid Composition

The present drilling fluid composition can suitably be used at a concentration from about 0.1 wt % to up to about 15 wt %, or from 0.5 wt % to 12 wt %, or from 1 wt % to about 10 wt %, or from about 1 wt % to about 5 wt % in a water-based drilling mud system, based upon the total weight of the water-based drilling mud.

In addition to the drilling fluid additive, such water-based drilling muds can comprise other conventional additives and additive packages. Suitable additives include, but are not limited to emulsifiers, thinners, surfactants, electrolytes, viscosifiers, polymeric inhibitors, clays, starches, alkalinity and pH control additives, bactericides, calcium reducers, corrosion inhibitors, defoamers, hydrate suppressants, and temperature stability agents. A suitable additive package may consist, for example, of a blend of sulfurized fatty acids and modified fatty acids for lubrication; a blend of modified fatty acid and amides for spotting; a blend of electrolytes, inhibiting polymers, or thinners for shale inhibition; a clay, a starch, a polymeric loss control agent, or combinations thereof, for fluid loss control; and a blend of lubricating, shale inhibiting, and fluid loss control additives for ROP enhancement. The selection of a suitable additive package is a matter of design choice and can be determined based upon the application of interest. Various additives and additive packages suitable for use in water-based drilling muds contemplated for various applications are described in US Patent Publication No. 20070287636, hereby incorporated herein by reference in its entirety for any and all purposes.

Oil Based Drilling Fluids Comprising the Drilling Fluid Composition

The present drilling fluid composition can be used as the base oil in an oil-based drilling mud. In such embodiments, the drilling fluid composition is present in the oil-based drilling mud in amounts from about 50 wt % to about 99 wt %, or from about 55 wt % to about 95 wt %, or from about 60 wt % to about 90 wt %, based upon the total weight of the oil-based drilling mud.

In some embodiments, the present drilling fluid composition can be used as a nontoxic replacement for the conventional types of oils used as base fluids in oil-based drilling muds. In such embodiments, the drilling fluid composition can be combined with additives that are suitable for performing functions such as, but not limited to, lubrication, unsticking drill pipe, ensuring hole/shale stability via shale inhibition, fluid loss control, enhancing rate of penetration, rheology control, stabilization of emulsions, corrosion control, and coring. The selection of a suitable additive package is well within the knowledge of those of ordinary skill in the art, and will be based upon the application of interest.

Some embodiments will now be described in detail in the following non-limiting examples.

Method of Lubricating a Borehole

A method of lubricating a borehole is also provided. Exemplary boreholes include downhole wells (e.g., oil, gas and water wells), tunnels (e.g., heating tunnels and transit tunnels), and cable passages (e.g., boreholes for fiber optic cable conduits). The method generally comprises providing a drilling fluid composition comprising a polymerized biorenewable oil and at least one of biodiesel and a nonpolymerized biorenewable oil to the borehole (e.g., a downhole well); and circulating the composition through the bore.

EXAMPLES

Example 1

A water-based base drilling fluid (Generic Mud #7 industry standard) was prepared from the following ingredients: 289.5 mL tapwater, 20.0 g API bentonite. 2.0 g ligno-sulfonate, 2.0 g lignite, 1.0 g caustic soda, 25.0 g SEBC, and 165.0 g Barite 4.

The base drilling fluid was modified by the addition of 3% by volume of i) a conventional drilling fluid additive (Table 1) or ii) an inventive drilling fluid composition (Table 2). All drilling fluids were hot rolled for 16 hours. Lubricity was measured on a ring and block lubricity tester. The percent improvement in the coefficient of friction (COF) was calculated as follows:

$$\text{(COF base drilling fluid+conventional additive OR inventive drilling fluid composition/COF base drilling fluid)} \times 100 = \% \text{ Improvement COF}$$

Percent improvement in COF of base drilling fluid with added conventional additive (3 wt %), is shown in Table 1 below. Percent improvement in COF of base drilling fluid with added inventive drilling fluid composition is shown in Table 2 below.

TABLE 1

| Sample # | Biodiesel | Biorenewable Oil | % Improvement COF |
|---|---|---|---|
| C1 | None | None | 0.0 |
| C2 | Yes | None | 30.1 |
| C3 | None | Crude Soybean oil | 12.5 |
| C4 | None | High Oleic Soybean oil | 6.3 |
| C5 | None | RBD[1] Canola Oil | ND[2] |
| C6 | None | Blown Rapeseed oil Z viscosity at 25 C. | 17.0 |
| C7 | None | Blown Soybean Oil Z3 viscosity at 25 C. | 7.0 |
| C8 | None | Blown Canola Oil Z2 | ND[2] |

[1]Refined and bleached.
[2]Not determined

TABLE 2

| Sample # | Component 1 | Component 2 | Component 3 | Ratio | % Improvement COF |
|---|---|---|---|---|---|
| Inv 1 | Biodiesel | Blown Canola Z2 | | 15/85 | 65.9 |
| Inv 2 | Biodiesel | Blown Soy Z2 | | 15/85 | 73.9 |
| Inv 3 | Biodiesel | RBD Canola | Blown Canola Z2 | 15/42.5/42.5 | 65.5 |
| Inv 4 | Biodiesel | RBD Canola | Blown Soya Z2 | 15/70/15 | 52.5 |
| Inv 5 | RBD Canola | Blown Canola Z2 | | 80/20 | 55.2 |
| Inv 6 | RBD Canola | Blown Canola Z2 | | 50/50 | 69 |

As shown in Table 1, neither the use of a nonpolymerized biorenewable oil (Samples C3, C4 and C5) nor a polymerized biorenewable oil (Samples C6 and C7) alone provided a commercially significant improvement (e.g., >20%) to the coefficient of friction of the base drilling fluid. While the COF improvement of RBD canola oil and blown canola oil Z2 and were not determined, it is expected that both would perform similarly to the nonpolymerized soy oils (C3 and C4. % improvement COF less than 15%) or blown rapeseed and soybean oils (C6 and C7. % improvement COF less than 20%), respectively. Finally, while the biodiesel provided an improvement of 30.1%, even greater improvements in the coefficient of friction of water-based drilling fluids are needed in the art.

As shown in Table 2, with improvements of 52-74% in COF over the base drilling fluid without the inventive drilling fluid composition, all inventive drilling fluid compositions provided a commercially significant improvement to the coefficient of friction of the base drilling fluid. In the case of Inventive Sample Inv 2, synergistic results are seen.

More specifically, the use of biodiesel as the sole drilling fluid additive in the base drilling fluid (Sample C2, Table 1) resulted in an improvement in the coefficient of friction of 30.1%. And, the use of blown soy oil as the sole additive in the base drilling fluid (Sample C7. Table 1) resulted in an improvement in the coefficient of friction of 7.0%. And so, one of ordinary skill in the art, if motivated to combine blown soy oil and biodiesel (which motivation is not conceded by Applicant), might expect to see an improvement in the coefficient of friction the base drilling fluid of at most 37.1%. And yet, the improvement seen when both blown soy oil and biodiesel were incorporated into the base drilling fluid (Sample #Inv 2) was nearly double this, viz., 73.9%.

Similarly, the use of blown canola oil as the sole drilling fluid additive in the base drilling fluid (Sample C5, Table 1) is expected to result in an improvement in the coefficient of friction of less than 20%. And so, one of ordinary skill in the art, if motivated to combine blown soy oil and biodiesel (which motivation is not conceded by Applicant), might expect to see an improvement in the coefficient of friction the base drilling fluid of at most 50% or less. And yet, the improvement seen when both blown canola oil and biodiesel were incorporated into the drilling fluid (Sample #Inv 1) was significantly higher, viz., 65.9%.

Including an amount of nonpolymerized canola oil in the drilling fluid in addition to the biodiesel and blown canola oil (e.g., as with Inventive Samples Inv 3 and Inv 4) has no substantial impact on the results-which shows that at least in some embodiments, a lesser amount of the blown biorenewable oil can be utilized in combination with biodiesel while still providing an increase, or even a synergistic increase, in the coefficient of friction of the base drilling fluid as compared to the coefficient of friction of the base drilling fluid including only the blown biorenewable oil and biodiesel.

Example 2

The following oil-based drilling fluid compositions were prepared as shown in Table 3:

TABLE 3

| Sample # | Base Fluid, wt % | Biodiesel | Blown Soy Z2 |
|---|---|---|---|
| C9 | 100% No.2 Diesel[3] | — | — |
| C10 | 97 wt % 40 SUS naphthenic oil[4] @ 38° C. (100° F.) | 3 wt % | — |
| C11 | 83 wt % 40 SUS naphthenic oil[4] @ 38° C. (100° F.) | — | 17 wt % |
| Inv 7 | 80 wt % 40 SUS naphthenic oil[4] @ | 3 wt % | 17 wt % |

TABLE 3-continued

| Sample # | Base Fluid, wt % | Biodiesel | Blown Soy Z2 |
|---|---|---|---|
| C12 | 38° C. (100° F.) 97 wt % 100 SUS naphthenic oil[5] @ 38° C. (100° F.) | 3 wt % | — |
| C13 | 83 wt % 100 SUS naphthenic oil[5] @ 38° C. (100° F.) | — | 17 wt % |
| Inv 8 | 80 wt % 100 SUS naphthenic oil[5] @ 38° C. (100° F.) | 3 wt % | 17 wt % |

[3]Commercially available from Sun Coast.
[4]HYGOLD ™ 40 naphthenic oil, commercially available from Ergon Refining Inc.
[5]HYGOLD 100 naphthenic oil, commercially available from Ergon Refining Inc.

These drilling fluid compositions were combined with various additional components (ratio of drilling fluid composition to additional components of 80:20) to arrive at an industry standard finished mud formulation having a density of 1.44 Kg/L (viz., 12 pounds per gallon or "12 ppg oil-based mud") as shown below in Table 4:

TABLE 4

| Product | Commercial Source | C9 | Inv 7 | Inv 8 |
|---|---|---|---|---|
| Base Oil, ppb | Sun Coast, NA, NA | 187.79 | 207.09 | 215.57 |
| 25% CaCl₂, ppb | TX Brine Co. | 70.42 | 71.68 | 72.24 |
| Organoclay, ppb | Elementis | 7 | 7 | 7 |
| Primary Emulsifier, ppb | Ingevity | 6 | 6 | 6 |
| Secondary Emulsifier, ppb | Ingevity | 2 | 2 | 2 |
| Lime, ppb | Austin White Lime | 8 | 8 | 8 |
| Asphaltite/gilsonite, ppb | American Gilsonite | 4 | 4 | 4 |
| Barite 4.1, ppb | Excalibar Minerals, Baroid | 218.99 | 198.43 | 189.39 |

The properties of the resulting comparative and inventive oil-based drilling fluids were measured initially and after hot rolling at 149° C. (300° F.) for 16 hours according to API Recommended Practice 13B-1 or 13B-2 at Oilfield Testing and Consulting, Katy, TX. The results are shown below in Table 5:

TABLE 5

| | C9 | Inv. #7 | Inv. #8 |
|---|---|---|---|
| Initial Fluid Properties | | | |
| 600/300 rpm, 48.9° C. (120° F.) | 82/52 | 184/97 | 162/85 |
| 200/100 rpm, 48.9° C. (120° F.) | 42/29 | 67/36 | 58/31 |
| 6/3 rpm, 48.9° C. (120° F.) | 14/13 | 4/2 | 3/3 |
| Plastic viscosity, cP @ 65.6° C. (150° F.) | 30 | 87 | 77 |
| Yield Point, Kg/m² (lb/100 ft²) | 1.07 (22) | 0.49 (10) | 0.4 (8) |
| 10 s/10 m Gel Strength | 15/20 | 2/5 | 3/5 |
| Electrical Stability @ 65.6° C. (150° F.) | 1000 | 1164 | 908 |
| Fluid Properties after Hot Rolling | | | |
| 600/300 rpm, 48.9° C. (120° F.) | 65/37 | 326/183 | 273/139 |
| 200/100 rpm, 48.9° C. (120° F.) | 26/14 | 127/66 | 95/49 |
| 6/3 rpm, 48.9° C. (120° F.) | 4/3 | 4/3 | 3/2 |
| Plastic viscosity, cP @ 65.6° C. (150° F.) | 28 | 143 | 134 |
| Yield Point Kg/m² (lb/100 ft²) | 0.44 (9) | 1.95 (40) | 0.24 (5) |
| 10 s/10 m Gel | 13/35 | 4/3 | 3/2 |
| ES @ 65.6° C. (150° F.) | 1003 | 1500 | 1150 |
| High Temp/High Pressure (HTHP) | 5.4 | 10.4 | 23.2 |

TABLE 5-continued

| | C9 | Inv. #7 | Inv. #8 |
|---|---|---|---|
| Fluid Loss @ 149° C. (300° F.), mL | | | |
| Filter Cake, mm | 2 | 5 | 9 |
| Lubricity Calibration (RO/DI) | 33.2 | 32.8 | 33.8 |
| Correction Factor | 1.02 | 1.04 | 1.01 |
| Lubricity Meter Reading | 5.1 | 2.0 | 1.8 |
| Coefficient of Friction | 0.052 | 0.021 | 0.018 |
| Improvement in COF | 0 | 59.6% | 65.4% |

Inventive Samples 8 and 9 provided an increase in coefficient of friction of 59.6% and 65.4%, respectively, relative to a conventional diesel drilling fluid (Sample C9). Such an unexpected improvement in lubricity is notable over a conventional diesel mud. Further, based on the COF results reported above, Inventive Samples 7 and 8 are expected to exhibit synergistic COF improvement relative to Samples C10-C13, respectively. That is, the COF improvement of Inventive Sample 7 is expected to be greater than the COF improvements provided by Samples C10 and C11, taken together. Similarly, the COF improvement of Inventive Sample 8 is expected to be greater than the COF improvements provided by Samples C12 and C13. Inventive Samples 7 and 8 further show that amounts as low as 15% of the polymerized nonrenewable oil can provide significant improvements in coefficient of friction. The use of lesser amounts of polymerized nonrenewable oil can be preferred in some instances, as a more cost-conscious alternative that still provides significant advantages.

Although specific embodiments have been illustrated and described herein for purposes of description of certain aspects, it will be appreciated by those of ordinary skill in the art that a wide variety of alternative or equivalent implementations calculated to achieve the same purposes may be substitutes for the specific embodiments shown and described without departing from the scope of the present disclosure. This application is intended to cover any adaptations or variations of the preferred embodiments discussed herein. Therefore, it is manifestly intended that the scope of this disclosure be defined according to the attached claims, and equivalents thereof.

The invention claimed is:

1. A drilling fluid composition comprising a polymerized biorenewable oil, biodiesel and a nonpolymerized biorenewable oil, wherein the ratio of biodiesel to polymerized biorenewable oil is from 10:1 to 1:10 and the ratio of nonpolymerized biorenewable oil to polymerized biorenewable oil is from 10:1 to 1:10.

2. The drilling fluid composition of claim 1, wherein the ratio of biodiesel or nonpolymerized biorenewable oil to polymerized biorenewable oil is from 4:1 to 1:4.

3. The drilling fluid composition of claim 1, wherein the polymerized biorenewable oil has an oligomer content of from about 15 wt % to about 70 wt % and a polydispersity index of from about 1.2 to 20.0.

4. The drilling fluid composition of claim 1, wherein the polymerized biorenewable oil has a number average weight less than 100,000.

5. The drilling fluid composition of claim 1, wherein the polymerized biorenewable oil is a heat bodied oil.

6. The drilling fluid composition of claim 1, wherein the polymerized biorenewable oil is polymerized by co-reaction with a material selected from dibasic acids, polyols, amines, epoxides, phenolics, and olefinic hydrocarbon monomers.

7. The drilling fluid composition of claim 1, wherein the polymerized biorenewable oil or nonpolymerized biorenewable oil comprises a vegetable oil selected from the group consisting of soy, canola, rapeseed, mamouna, mustard, palm, babassu, pine, coffee, cottonseed, sunflower, jojoba, tung, castor, olive, peanut, cashew nut, pumpkin seed, corn, rice, perilla, sesame, coconut, safflower, linseed, hemp, Chinese tallow tree, tall oil, lecithin (phospholipids), and combinations thereof.

8. The drilling fluid composition of claim 1, wherein the biorenewable oil or nonpolymerized biorenewable oil comprises soy oil, canola oil, rapeseed oil, or a combination of these.

9. The drilling fluid composition of claim 1, wherein the composition comprises less than 5 wt % of petrodiesel, mineral oil, and mineral oil derivatives.

10. The drilling fluid composition of claim 1, wherein the composition is substantially free of petrodiesel, mineral oil, and mineral oil derivatives.

11. A water-based drilling fluid comprising up to about 15 wt % of a drilling fluid composition comprising a polymerized biorenewable oil and at least one of biodiesel and a nonpolymerized biorenewable oil, wherein wt % is based upon the total weight of the water-based drilling fluid, and wherein the drilling fluid composition comprises biodiesel or a nonpolymerized biorenewable oil and a polymerized biorenewable oil in a ratio of biodiesel or nonpolymerized biorenewable oil:polymerized biorenewable oil of from 10:1 to 1:10.

12. The water-based drilling fluid of claim 11, wherein the polymerized biorenewable oil or nonpolymerized biorenewable oil comprises soy oil, canola oil, rapeseed oil, or a combination of these.

13. The water-based drilling fluid of claim 11, wherein the drilling fluid composition comprises biodiesel or a nonpolymerized biorenewable oil and a polymerized biorenewable oil in a ratio of biodiesel or nonpolymerized biorenewable oil:polymerized biorenewable oil of from 4:1 to 1:4.

14. An oil-based drilling fluid comprising at least about 50 wt % of a drilling fluid composition comprising a polymerized biorenewable oil and at least one of biodiesel and a nonpolymerized biorenewable oil, wherein wt % is based upon the total weight of the oil-based drilling fluid, and wherein the drilling fluid composition comprises biodiesel or a nonpolymerized biorenewable oil and a polymerized biorenewable oil in a ratio of biodiesel or nonpolymerized biorenewable oil:polymerized biorenewable oil of from 10:1 to 1:10.

15. The oil-based drilling fluid composition of claim 14, wherein the drilling fluid composition comprises polymerized biorenewable oil, biodiesel and a nonpolymerized biorenewable oil.

16. A method of lubricating a borehole comprising:
  providing a drilling fluid composition comprising a polymerized biorenewable oil and at least one of biodiesel and a nonpolymerized biorenewable oil to a borehole; and
  circulating the composition through the borehole;
  wherein the drilling fluid composition comprises biodiesel or a nonpolymerized biorenewable oil and a polymerized biorenewable oil in a ratio of biodiesel or nonpolymerized biorenewable oil:polymerized biorenewable oil of from 10:1 to 1:10.

17. The method according to claim 16, wherein the drilling fluid composition is oil-based.

18. The method according to claim 16, wherein the drilling fluid composition is water-based.

* * * * *